United States Patent [19]

Pingel

[11] Patent Number: 4,815,233

[45] Date of Patent: Mar. 28, 1989

[54] FISH LURE

[76] Inventor: Robert L. Pingel, P.O. Box 45, Oakland, Ark. 72611

[21] Appl. No.: 144,180

[22] Filed: Jan. 15, 1988

[51] Int. Cl.⁴ ............................................. A01K 85/00
[52] U.S. Cl. .................................... 43/42.11; 43/42.13
[58] Field of Search ................. 43/42.11, 42.13, 42.19, 43/42.74, 42.84

[56] References Cited

U.S. PATENT DOCUMENTS

| | | | |
|---|---|---|---|
| 2,471,499 | 5/1949 | Shipman | 43/42.13 |
| 2,848,835 | 8/1958 | Witt | 43/42.74 |
| 3,110,979 | 11/1963 | Woodley | 43/42.13 |
| 3,991,505 | 11/1976 | Simeti | 43/42.74 |
| 4,209,932 | 7/1980 | Pate | 43/42.11 |
| 4,571,877 | 2/1986 | Montgomery | 43/42.11 |

Primary Examiner—Gene P. Crosby
Attorney, Agent, or Firm—Haverstock, Garrett & Roberts

[57] ABSTRACT

A fish lure with an elongated relatively stiff yet flexible carrier member having opposed end portions, a hook member attached to one end portion of the carrier member and a fishing device such as a spinner, blade or like member attached to the opposite end portion thereof. A line attachment member is mounted for rotational movement on the carrier member and an intermediate location therealong between the opposed end portions thereof, and a stop member attached to the carrier member adjacent to the line attachment member to prevent movement of the line attachment member along the carrier member. The carrier member is able to flex away from its normal unstressed condition when any portion thereof is subjected to a lateral force, the carrier member returning to its normal unstressed condition when such lateral force is removed. Use of a relatively stiff yet flexible carrier member enables the present device to move in a more realistic and attractive manner as it is being pulled through the water.

17 Claims, 2 Drawing Sheets

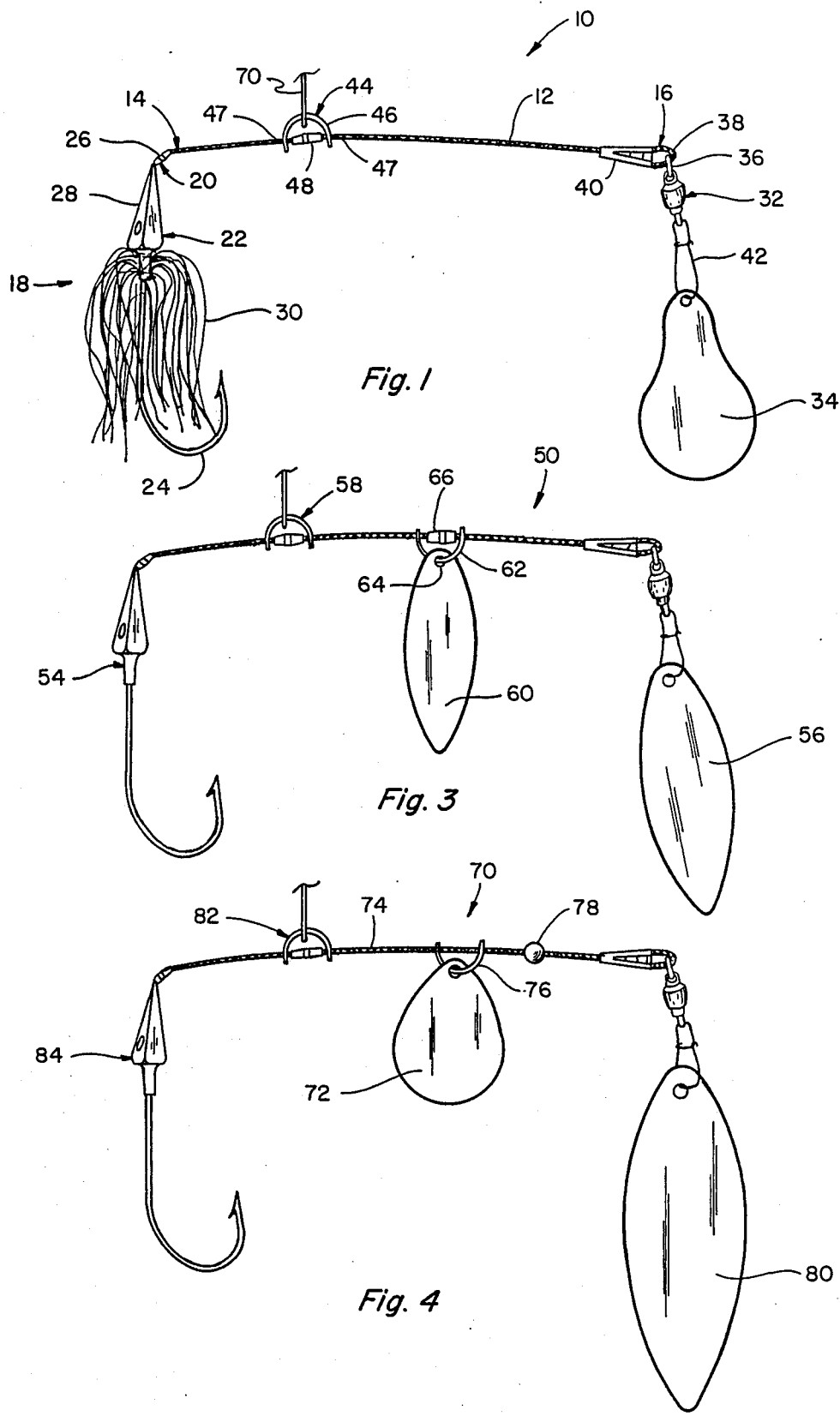

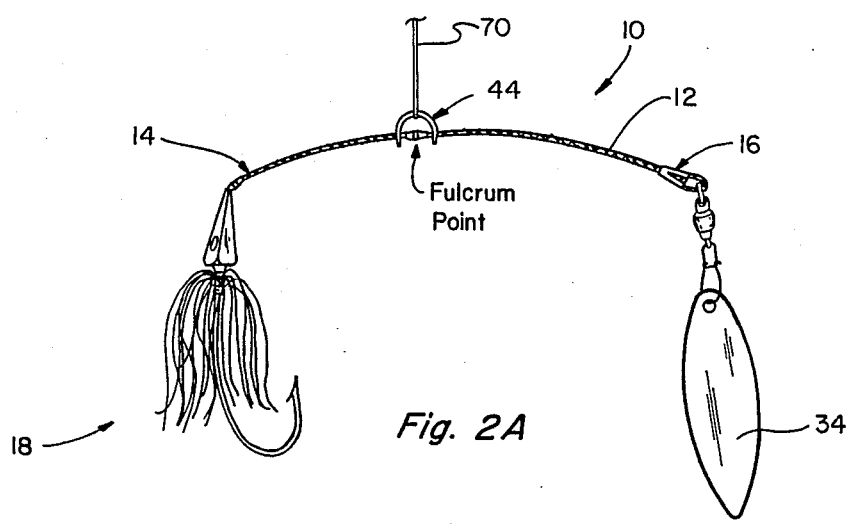
Fig. 2A
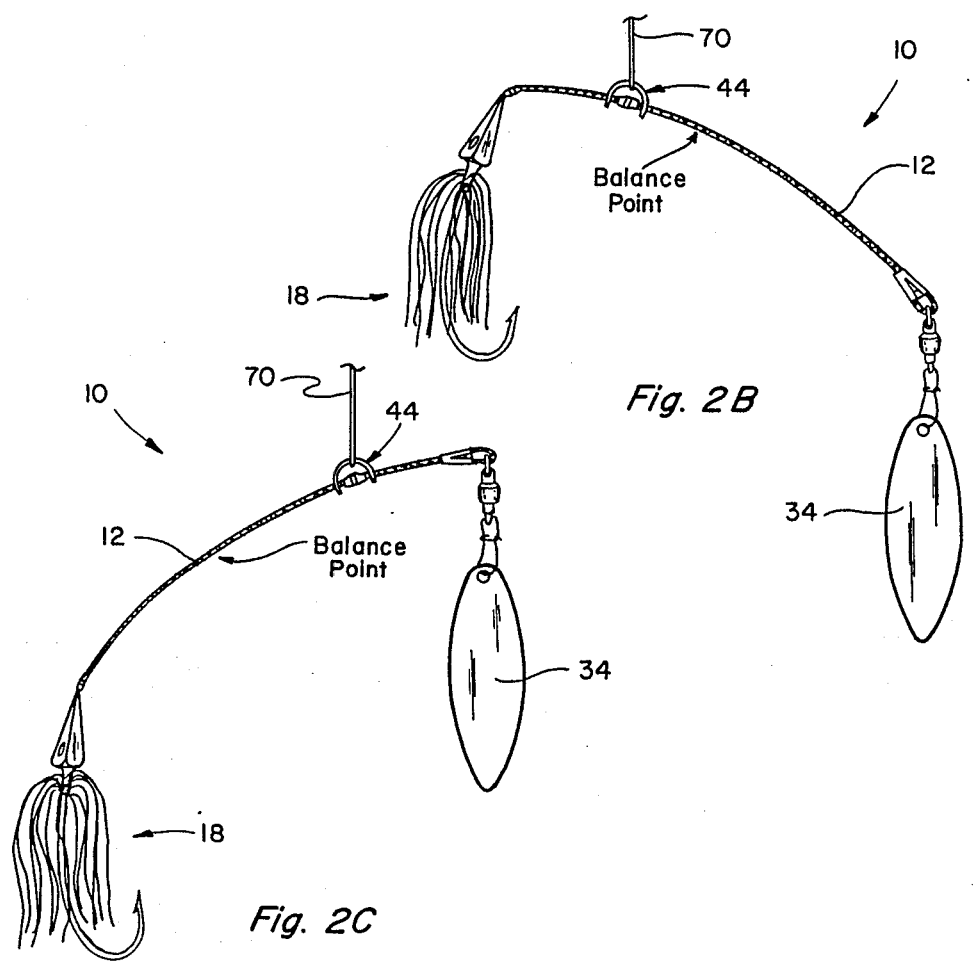
Fig. 2B
Fig. 2C

FISH LURE

The present invention relates to a fish lure device and, more particularly, to an improved lure device which has both a more realistic spring-like action when it hits the water and a more realistic and attractive action when it moves and travels through the water. The present lure device includes a relatively stiff yet flexible carrier member for attaching an artificial bait-hook or jig member thereto as well as any plurality of spinners, blades or other like devices, the flexible member enabling the present device to flex, twist, turn and move in a more realistic manner as it is being retrieved through the water. The present device more accurately simulates the movements of a live bait in the water and more effectively attracts fish to the jig or hook region of the device.

BACKGROUND OF THE INVENTION

Lure devices are designed to simulate the movement and actions of various bugs, insects and other creatures which are attractive to fish as bait when such devices are moved through the water. Therefore, how realistically such devices move and travel through and under the water as they are being retrieved, such as after casting and/or during trolling, dictates how effectively such lure devices will attract fish. Many different kinds of fish lure devices have been designed and constructed in the past for various purposes and to attract different kinds of fish. Such known lure devices teach a wide variety of constructions for accomplishing this task. Typical of such known devices are the constructions shown and disclosed in U.S. Pat. Nos. 3,500,573; 3,673,726; and 4,201,008. For example, all of the known prior art constructions including the above-referenced constructions include blades, spinners, fish hooks, jigs and/or other lure or fishing type devices mounted in various arrangements on a non-bendable, rigid wire type member or carrier bracket, the carrier bracket including means such as an eyelet for attaching a fishing line or other well known line fastener device to such device. Since the known prior art lure devices utilize carrier members which are fabricated totally from rigid, non-bendable type members, movement through the water of the jigs and/or other hook members associated with such known devices is somewhat restricted due to the limited ability of such lures to flex, twist and turn during retrieval and therefore these devices do not represent the most realistic simulation of the movements and actions of certain live bait creatures which are attractive to fish. Also, the jigs and/or hook members associated with the known constructions are not necessarily ideally oriented in the water as they are being pulled therethrough and such members are not totally accessible by fish from all angles of attack and, importantly, such members do not freely flex and bend when a fish strikes such devices. Therefore, many of the known lure devices may be easily pulled out of a striking fish's mouth depending upon the direction and angle of strike relative o the lure device. A totally rigid, non-bendable construction also makes the known lure devices somewhat difficult and awkward to handle and attach to a fishing line, and most are highly susceptible to entanglement with the fishing line both during casting and retrieval. Furthermore, the known lure devices are not generally adaptable for both shallow and deep water fishing and none include a relatively stiff yet flexible carrier member for more realistically simulating the actions and movements of certain live bait creatures through the water thereby increasing one's chances of attracting and catching a fish. Also, none of the known devices utilize a non-rigid structure which enables such devices to be easily compacted for handling and transporting, and to be stored and packaged to occupy very little space when not in use.

SUMMARY OF THE INVENTION

The present invention overcomes many of the disadvantages and shortcomings associated with the known prior art constructions and teaches the construction and operation of a relatively simple lure device which includes a relatively stiff yet flexible elongated carrier member adapted to have any number of spinners, blades or other fishing devices attached thereto at spaced locations therealong. An artificial bait-hook member or jig is fixedly secured to one end portion of the flexible member while means such as ball bearing swivel means are located at the opposite end portion thereof for removably attaching a spinner, blade or other like fishing device thereto. The spinner and blade devices aid in creating attractive movement of the lure through the water and such devices also help to establish the desired depth at which the device will travel through the water. The carrier member is preferably comprised of a relatively stiff yet flexible material having sufficient elasticity to return to its normal unstressed condition after being flexed or twisted. It has been found that certain types of flexible wire, woven wire and cable materials produce the desired results as will be hereinafter more fully explained. The spinners, blades and other like devices are generally casted from nickel, copper, gold or like metals which reflect light and vibrate as they move through the water to further aid in attracting fish. Various embodiments of the present device provide means for attaching any plurality of spinners, blades and like devices to the present device, if so desired, and these devices may be either fixedly secured to the flexible carrier member or they may be mounted so as to be slidably movable along at least a portion of the length thereof to still further aid in attracting fish to the present device.

Means for attaching a fishing line to the present lure device is mounted on the flexible carrier member intermediate the respective opposite ends thereof. The exact location of such line attachment means along the length of the flexible carrier member may be varied to some extent to produce different lure actions and to accommodate any particular number of blades and/or spinners utilized on the present device. However, in this regard, it is generally preferred that the line attachment means be located such that when tee present device is being pulled through the water, the hook means will be positioned and travel at a location which is slightly forward of any blade members associated with the device. This means that the line attachment means should be preferably mounted to the carrier member in the region of the fulcrum or balance point of such member, but slightly offset therefrom in the direction of the hook means as will be hereinafter more fully explained. In addition, locating the line attachment means intermediate the respective opposite ends of the flexible member enables the hook means or jig member to be more accessible and to more freely flex, bend, twist and turn regardless of the particular direction and angle of strike and this substantially increases one's chances of successfully hooking a fish upon initial strike. This is not true of the known prior art lure constructions wherein the rigid, non-bendable carrier portions of such constructions prohibit and/or restrict free access to the hook area of the lure from certain strike angles. This is important to the present invention because this means that the present lure can successfully hook a fish no matter how the fish approaches and strikes the device. Also, importantly, the present device includes means for preventing movement of the line attachment means along the flexible carrier member while at the same time allowing the line attachment means to freely rotate 360° about the carrier member. This is likewise important because this allows the present device to more freely flex, twist and turn in the water without interference from the line attached thereto and this arrangement also substantially prevents the fish line from becoming entangled with the lure both as it moves through the water during retrieval and as it travels through the air during casting.

Any number of blades, spinners and/or other fishing devices may be attached intermediate the respective opposite ends of the flexible carrier member. These additional devices may be either fixedly secured to the flexible member at an intermediate location therealong, or such devices may be attached by means which allow such devices to freely move and float along at least a portion of the length of the flexible member so as to further aid in attracting and catching fish. Since any number of such fishing devices may be attached to the present device, depending upon the particular size and type of fish to be caught, the present lure device can be arranged and configured with the appropriate blades and/or spinners and/or with additional weights so as to travel through the water at any desired depth as it is being retrieved after casting and/or during trolling. This enables the present device to be used both as a spinnerbait and as a jig thereby producing a versatile lure for either shallow or deep water fishing. The present lure can therefore be flipped like an ordinary jig into thick cover, hopped down a rocky point like a spinnerbait, and it can be fished at depths not previously practical for spinnerbait type lures. Use of the relatively stiff yet flexible carrier member also enables the present lure to hit the surface of the water with a more realistic spring-like action and further enables the present lure to sink or fall below the water's surface with a swinging action, this swinging action further aiding in attracting fish to the present device. These are all important features which increase the versatility, usefulness and realism of the present device and substantially aid in increasing one's chances for successfully attracting and catching fish.

It is therefore a principal object of the present invention to teach the construction and operation of a fish lure which allows such lure to flex, twist, turn and move in a more realistic manner as it travels through the water.

Another object is to teach the construction and operation of a relatively simple, practical and easy to use fish lure that will more effectively attract fish.

Another object is to teach the construction and operation of a fish lure which utilizes a relatively stiff yet flexible carrier member for attaching an artificial bait-hook member, spinners, blades and/or other fishing devices thereto.

Another object is to teach the construction and operation of a fish lure which is able to flex away from its normal unstressed condition when any portion thereof is subjected to a lateral force, the lure also being able to return to its unstressed condition when such lateral force is removed.

Another object is to provide a fish lure which can be easily compacted for handling and transporting, and can be stored and packaged to occupy very little space when not in use.

Another object is to provide a fish lure wherein the hook region of such device is more freely accessible to a fish from all strike angles.

Another object is to teach the construction and operation of a fish lure which falls through the water with a swinging action to further aid in attracting fish thereto.

Another object is to provide a fish lure which can successfully hook a fish no matter how the fish approaches and strikes the present lure.

Another object is to provide a fish lure which includes means for removably engaging various types of blades and/or spinners to such device depending upon the particular type and size of fish desired to be caught.

Another object is to provide a fish lure which can be utilized both as a spinnerbait and as a jig.

Another object is to provide a fish lure which may be used for both shallow and deep water fishing.

Another object is to provide a fish lure which has an attractive action when moving through water.

Another object is to provide a relatively inexpensive and easy to construct fish lure which substantially increases the flexibility and versatility of a fisherman's equipment.

Another object is to provide a fish lure which overcomes the problem of lure entanglement with the fishing line during casting and retrieval.

These and other objects and advantages of the present invention will become apparent to those skilled in the art after considering the following detailed specification in conjunction with the accompanying drawings.

BRIEF DESCRIPTION OF THE DRAWINGS

FIG. 1 is a side elevational view of one embodiment of the present fish lure constructed according to the teachings of the present invention;

FIG. 2A is a side elevational view showing the lure device of FIG. 1 being pulled through the water in a balanced condition;

FIGS. 2B and 2C are side elevational views showing the lure device of FIG. 1 being pulled through the water in an unbalanced condition;

FIG. 3 is a side elevational view of another embodiment of the present fish lure constructed according to the teachings of the present invention; and FIG. 4 is a side elevational view of still another embodiment of the present fish lure.

DETAILED DESCRIPTION OF THE INVENTION

Referring to the drawings more particularly by reference numbers wherein like numerals refer to like parts, number 10 in FIG. 1 identifies one embodiment of a fishing lure constructed according to the teachings of the present invention. The lure device 10 includes a relatively stiff yet flexible carrier or cable member 12 having opposed end portions 14 and 16, the carrier end portion 14 having an artificial bait-hook member or other jig device 18 fixedly secured thereto while the end portion 16 includes means in the form of a ball bearing swivel 32 for removably attaching a spinner, blade or other like fishing device thereto. The member 12 is preferably formed of a relatively stiff yet flexible wire, woven wire or cable type material of sufficient strength to withstand the impact associated with fish strikes without breakaqe depending upon the particular type and size of fish for which the lure is designed. The flexible member 12 must be able to flex or bend away from its normal unstressed condition when any portion thereof is subjected to greater lateral forces than other adjacent portions such as the forces exerted thereagainst while pulling the present lure through the water or encountered during a particular fish strike. Also, importantly, the carrier member 12 must have sufficient elasticity or resiliency to return to its normal unstressed condition when all such lateral forces are removed or eliminated. This is important to the present invention because it is the flexibility and resiliency of the carrier member 12 which enables the present lure to move in a more realistic manner as it travels through the water and affords all of the advantages of the present device. The particular gauge and type of wire or cable material selected depends upon the particular size and type of fish desired to be caught and the desired range or degree of flexibility and resiliency. It is also anticipated that other types of relatively stiff yet flexible materials may work equally as well.

The hook or jig member 18 includes a carrier engaging portion 20, a bait portion 22 and a hook member 24. The carrier engaging portion 20 generally comprises a tubular connector member 26 having one end portion fixedly connected by any suitable means to the bait portion 22 and having its opposite end portion adaptable for insertably receiving one end portion of the flexible member 12. When the carrier end portion 14 is insertably positioned within the tubular connector member 26, the member 26 may be fixedly secured thereto by crimping or otherwise deforming such member into engagement with the carrier end portion 14. It is also recognized that the carrier engaging portion 20 may include a wide variety of other suitable means for attaching the hook or jig device 18 to one end portion of the flexible member 12.

The bait portion 22 of the jig 18 generally includes a body portion 28 and a skirt portion 30, both of which are shaped and dimensioned to represent, in appearance, any one of a plurality of various bugs, insects and other like creatures which are generally attractive to fish. Also, both the body portion 28 and the skirt portion 30 may be colored to aid in visually attracting fish and the body portion 28 may include characteristic marks and other indicia and artistic designs which are representative of the particular live bait simulated by the member 18. In this regard, the bait-hook member 18 shown in FIG. 1 is for illustrative purposes only and it is recognized that a wide variety of various types of bait-hook members may be utilized with the present invention, the specific type, shape and dimension of such members depending primarily upon the particular type of fish desired to be caught. It is also recognized that various shapes and sizes of hook members such as the hook 24 may be utilized in conjunction with the present lure 10 depending upon the particular type and size of fish desired to be caught.

Means in the form of a ball bearing swivel 32 for removably attaching a blade device such as the blade 34 is fixedly secured to the opposite end portion 16 of the flexible member 12 as shown in FIG. 1. The swivel 32 includes an eyelet 36 which is cooperatively engageable with a loop 38 formed adjacent the end portion 16 of the flexible member 12. The loop 38 can be formed in a conventional manner by inserting the free end of the carrier portion 16 through a tubular connector member 40, the member 40 being substantially similar to the member 26, and thereafter forming a loop and re-inserting the free end portion thereof back through the member 40 as shown in FIG. 1. The tubular member 40 is then crimped or otherwise deformed into tight engagement with the flexible member 12 to complete the joinder therebetween. The eyelet 36 may include means for removably engaging the same with the loop 38 or the free end portion of the member 12 may be insertably positioned through the eyelet 36 prior to reinsertion back through the member 40. It is also recognized that any other suitable means for fixedly securing the swivel 32 to the carrier end portion 16 may be utilized.

The blade device 34 is removably engaged with the swivel 32 by any suitable fastening means such as by utilizing the locking means 42 shown in FIG. 1. The locking means 42 includes a substantially U-shaped clasp-type member which is cooperatively engageable with an opening (not shown) positioned adjacent the opposite end portion of the swivel 32. The swivel bearing 32 and the locking means 42 provide a simple and easy means for removably attaching a wide variety of various blades, spinners and/or other fishing devices to the present lure depending upon the particular application desired. Each blade and/or spinner is specifically designed to reflect light in a certain flashing type manner and to vibrate in a certain manner so as to further aid in attracting fish to the lure. The ability to easily and quickly remove and change the blade or spinner type device associated with the carrier end portion 16 further increases the flexibility and usefulness of the present device and enables a fisherman to adapt the present lure to any particular fishing environment.

A line attachment member 44 is hingedly attached intermediate the respective opposite end portions 14 and 16 of the flexible member 12. The member 44 includes a substantially U-shaped member 46 having an opening 47 associated adjacent the respective free opposite ends thereof, the member 44 being slidably engageable with the member 12 by insertably positioning one free end portion of the member 12 through the respective openings 47. Stop means in the form of a deformable member 48 is mounted on the flexible member 12 between the opposed free end portions of the member 44 as shown in FIG. 1. The member 48 prevents the member 44 from moving along the length of the flexible member 12 and may be crimped or otherwise fixedly secured to the member 12 by any suitable means. It is recognized that other means attached to the carrier member 12 adjacent the line attachment means 44 may likewise be utilized to prevent movement of the member 44 along the member 12.

A fishing line such as the line 70 or other well known line fastener devices may be attached to the member 44 in any suitable conventional manner. Although the line attachment member 44 is prevented from moving along the length of the carrier member 12, it is important to note that the member 44 is hingedly attached to the member 12 and is therefore free to rotate 360° about the member 12. This means that the device 10 can freely flex, twist, turn and otherwise move in the water without being hindered or interfered with by the line 70 attached thereto. This substantially prevents the line 70 from becoming entangled with the jig 18 or the blade member 34 as they move through the water and it also substantially prevents entanglement as the lure 10 travels through the air during casting regardless of the type of casting action used. These are important features which improve the effectiveness, efficiency and performance of the present device 10.

The exact location of the line attachment member 44 along the flexible member 12 may be varied to regulate the amount of flex associated with the member 12 and to accommodate the particular type of action desired as the device 10 moves through the water. Forces exerted along the flexible member 12 such as by the water currents, by pulling the device 10 through the water, by having a fish strike the present lure, or by any other means will cause at least certain portions of the member 12 to flex or bend relative to other portions thereof away from their normal unstressed condition, the amount of such flexing depending upon where the member 44 is attached to the member 12. For example, if the member 44 is located adjacent the end portion 14 of the member 12, relatively little action will be realized by the hook or jig member 18. This arrangement is not particularly desirable since it produces very little jig action. However, if the line attachment member 44 is positioned intermediate the respective ends of the flexible member 12 as shown in FIG. 1, both the hook or jig member 18 as well as the blade member 34 will flex, twist and turn independent of each other during retrieval of the device through water. The amount of movement and attractive action associated with the respective members 18 and 34 will be dependent upon the exact positioning of the line attachment member 44 therebetween as will be hereinafter more fully explained. This intermediate arrangement also enables both members 18 and 34 to be located downstream from the line attachment member 44 during retrieval thereby providing free access to the hook region of the device from all possible strike angles. This is important to the present invention because this means that the present device 10 can successfully hook a fish no matter how the fish approaches and strikes the hook or jig member 18 thereby greatly increasing one's chances of successfully hooking a fish upon initial strike. Once any force exerted along the flexible member 12 is removed, the member 12 will return to its normal unstressed condition. The intermediate location of the line attachment member 44 in conjunction with the use of a relatively stiff yet flexible member 12 therefore provide means for allowing the device 10 to move in a more realistic manner as it travels through the water and substantially increases one's chances for successfully hooking a fish no matter how the fish approaches and strikes the present device.

Although the location of the line attaching means 44 may be varied along the length of the flexible member 12 as indicated above, it is usually preferred that such means 44 be located in the region of the fulcrum or balance point of the flexible member 12 based upon the weight of the respective members 18 and 34. The exact location of the member 44 between the respective carrier end portions 14 and 16 will dictate the type of lure action achieved as the device is pulled through the water or lateral forces created by other means as previously explained are exerted along the member 12. For example, the line attachment means 44 may be located at the fulcrum or balance point of the member 12 so that, when pulled through the water, the member 12 will flex so as to maintain the jig 18 and the blade 34 in a substantially balanced position as shown in FIG. 2A. This enables the members 18 and 34 to be more ideally oriented in the water for attracting and catching fish and also keeps the members 18 and 34 substantially separated so as to avoid entanglement with each other and with the fishing line 70. Also, importantly, such an arrangement enables the fishing line 70 to remain substantially normal to the flexible member 12 during retrieval and this further aids in preventing lure-line entanglement. As can be seen from FIG. 2A, while being pulled through the water, the hook or jig member 18 remains totally accessible to a fish from all strike angles, a feature which is not true of the known prior art lure devices.

As the line attachment means 44 is moved away from the fulcrum or balance point of the member 12 towards either of the respective opposite end portions 14 or 16, the fishing line 70 will no longer remain substantially normal to the flexible member 12 and the members 18 and 34 will be pulled through the water in a somewhat unbalanced condition as best illustrated in FIGS. 2B and 2C depending upon which direction the attachment means 44 is shifted or offset relative to the fulcrum point of the member 12. It has been found that the arrangement illustrated in FIG. 2B wherein the jig 18 is located slightly forward of the blade member 34 as the device 10 is being pulled through the water is generally preferred since this has produced the best results under a wide variety of different fishing conditions. Nevertheless, the balanced and unbalanced arrangements illustrated in FIGS. 2A and 2C may likewise be desirable in certain situations. In any event, the location of the line attachment means 44 along the length of the flexible carrier member 12 may be varied depending upon the particular type of lure action desired. Also, regardless of the arrangement selected, the members 18 and 34 remain substantially separated so as to avoid entanglement and the hook or jig member 18 remains totally accessible to a fish from all strike angles.

FIG. 3 illustrates another embodiment 50 of the present device which is similar in construction and operation to the lure device 10 illustrated in FIG. 1 and includes a flexible member 52, a hook or jig member 54, a blade member 56, and a line attachment member 58. The members 54 and 56 are attached to the respective opposite end portions of the flexible member 52 by any suitable means such as by the means previously explained with respect to the lure device 10. Similarly, the line attachment means 58 is secured to the flexible member 52 in a manner substantially similar to the manner in which the member 44 is attached to the member 12 as previously explained. The lure device 50 differs from the device 10 in that an additional blade member 60 is hingedly attached to the member 52 at an intermediate location between the member 58 and the blade member 56. The blade member 60 is secured to the member 52 by means of a substantially U-shaped member 62, the member 62 being substantially similar in construction and operation to the members 44 and 58 as previously described. The blade member 60 includes an opening or aperture 64 adjacent one end portion thereof and is attached to the flexible member 52 by inserting one end portion of the member 62 through the opening or aperture 64 and thereafter securing the member 62 to the member 52 as previously described with respect to the embodiment shown in FIG. 1.

A deformable member 66 similar to the member 48 (FIG. 1) is positioned and engaged with the member 52 intermediate the free opposite ends of the member 62 so as to prevent the blade member 60 from sliding along a portion of the length of the member 52. Although the deformable member 66 prevents movement of the blade member 60 along the member 52, the blade 60 is likewise free to rotate 360° about the member 52 thereby providing still further movement and action to the lure device 50. The line attachment means 58 may likewise be attached to the flexible carrier member 52 relative to the fulcrum or balance point as previously described depending upon the type of lure action desired. It is also anticipated that the blade members 56 and 60 may be of different styles and designs as compared to each other and as compared to the blade member 34 associated with the device 10 (FIG. 1), the particular size, style and design being dependent upon the particular type of lure action desired. Besides adding more action and movement to the device 50, use of the additional blade member 60 may also add additional weight to the overall device thereby affecting the depth at which such device travels through the water as it is being retrieved after casting and/or during trolling. This depth can be controlled by properly selecting the appropriate blade members to be attached to the present device and/or by adding additional weight members to the flexible member 52. The lure device 50 (FIG. 3) performs in substantially the same manner as the device 10 (FIG. 1), however, the device 50 provides a different lure action as it travels through the water.

FIG. 4 discloses yet another embodiment 70 of the present lure device, the device 70 being likewise substantially similar in construction and operation to the device 50 (FIG. 3) but differs therefrom only in that the additional blade member 72 attached to the flexible carrier member 74 does not include stop means such as the member 66 (FIG. 3) positioned between the opposed free end portions of the U-shaped member 76. This means that the blade member 72 is free to slidably move along at least a portion of the length of the member 74 to produce still a different type of lure action as the device 70 is retrieved through the water. A ball type member 78 having an opening (not shown) sized and dimensioned so as to cooperatively receive the flexible member 74 when insertably positioned therethrough may also be fixedly secured to the member 74 intermediate the blade members 72 and 80. The member 78 acts as a spacing and buffer member so as to prevent the blade 72 from becoming entangled with the blade 80. In this situation, the blade 72 is free to float along a portion of the length of the flexible member 74 between the member 78 and the line attachment member 82 and this produces still a further variation in lure action as the device 70 is retrieved through the water. The ball-type member 78 may also be constructed so as to freely slide along the member 74 if so desired. Many other variations of blade styles and designs as well as other blade engagement means may also be utilized with the present invention.

The various embodiments of the present lure device may each be specifically designed to attract and catch a wide variety of different types and sizes of fish and such lure designs may include any number and/or arrangement of blades, spinners and/or other fishing devices as previously explained depending upon the particular type of fish desired to be caught and the type of water and other fishing conditions affecting the same. Lure type devices may be attached intermediate the respective opposite ends of the flexible carrier member in a manner similar to that illustrated with respect to the embodiments 50 and 70 illustrated in FIGS. 3 and 4. In addition, variations in hook size as well as the overall artificial bait-hook configuration including skirts and other similar devices may be utilized in conjunction with the present lure devices. Also, various known types of weed guard devices may likewise be attached or otherwise associated with the hook or jig portion of the present devices to help prevent the present devices from becoming entangled with weeds and other objects located below the surface of the water during retrieval. It is further recognized that a wide variety of blade and spinner styles may be utilized in conjunction with the present invention as well as a wide variation in blade, spinner and skirt colors depending upon the particular application desired. In this regard, it should be noted that the hook or jig members 54 and 84 (FIGS. 3 and 4) do not include a skirt member as does the member 30 illustrated in FIG. 1. Regardless of the final lure design achieved, use of the flexible carrier member enables the present devices to travel through the water more naturally and more realistically because the various blades, spinners and other fishing devices attached thereto are more freely and naturally affected by the water currents and are not as resistant to such currents and/or to other external forces encountered under water as is true of the known prior art devices which include rigid, non-bendable carrier members. This means that the present lure devices travel more naturally through the water and this substantially enhances one's chances of attracting and catching fish.

Use of the flexible carrier or cable member also enables the present lure devices to hit the surface of the water with a more realistic spring-like action and likewise further enables the present devices to sink or fall below the water's surface with a more realistic swinging action since the flexible carrier member is more responsive to water currents and other forces as previously explained. This swinging action further aids in attracting fish to the present devices. Also, the flexible nature of the carrier member enables a user to easily fold and/or coil the present devices into a relatively small size and shape so as to allow the user to easily carry and transport the present devices from one location to another. This collapsibility and flexibility provides maximum portability of the present devices for use whenever and wherever desired and also enables such devices to be packaged for sale to occupy very little space. It is also important to note that the overall dimensions of the present devices as well as the particular configuration and size of the respective spinners, blades, and other fishing devices attached thereto are subject to wide variations and each may be sized and shaped into a wide variety of different sizes and configurations without impairing the teachings and practice of the present invention. In addition, in all forms of the present construction, the amount of flexing and the resiliency of the carrier member can be varied as required. This can be done by selecting the approximate type of flexible material having the desired properties and by changing the size, shape and length of the carrier member.

Thus, there has been shown and described a novel fish lure which exhibits a more realistic and attractive action when traveling through water, which device fulfills all of the objects and advantages sought therefor. Many changes, modifications, variations and other uses and applications of the present constructions will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. An improved fish lure comprising an elongated relatively stiff yet totally flexible carrier member having opposed end portions, hook means engageable with one end portion of said carrier member and blade means engageable with the opposite end portion thereof, line attachment means mounted on said carrier member at an intermediate location therealong between said opposed end portions, said line attachment means permitting the end of a line to be fixedly secured thereto, means to prevent movement of said line attachment means along said carrier member, said carrier member being capable of unrestricted bending in all directions and being able to freely flex away from its normal unstressed condition when any portion thereof is subjected to an external force, said carrier member having sufficient elasticity to return to its normal unstressed condition when such force is removed.

2. The improved fish lure defined in claim 1 wherein said line attachment means is mounted for rotational movement about said carrier member.

3. The improved fish lure defined in claim 1 wherein said carrier member is a wire member.

4. The improved fish lure defined in claim 1 wherein said carrier member is a wire member.

5. The improved fish lure defined in claim 1 wherein said line attachment means is mounted on said carrier member at a location that is closer to where the hook means is engaged as compared to where the blade means is engaged.

6. The improved fish lure defined in claim 1 wherein said line attachment means is mounted on said carrier member at a location that is closer to where the blade means is engaged as compared to where the hook means is engaged.

7. The improved fish lure defined in claim 1 wherein said blade means is removably attachable to said carrier member.

8. The improved fish lure defined in claim 1 wherein said blade means includes a spinner.

9. The improved fish lure defined in claim 1 wherein said hook means includes a jig.

10. The improved fish lure defined in claim 1 wherein said line attachment means includes a member hingedly attached to said carrier member, and other means fixedly attached to said carrier member adjacent to said attachment means to prevent movement of said attachment means along said carrier member.

11. An improved fish lure comprising an elongated relative stiff yet totally flexible carrier member having opposed end portions, a fishing device attached to each of said opposed end portions, line attachment means mounted on said carrier member at an intermediate location therealong between said opposed end portions, means attached to said carrier member adjacent to said line attachment means to prevent movement thereof along said carrier member, said carrier member being capable of unrestricted bending in all degrees of freedom and being able to freely flex away from its normal unstressed condition when any portion of said member is subjected to a greater lateral force than other adjacent portions thereof, said carrier member having sufficient resiliency to return to is normal unstressed condition when the lateral forces exerted therealong are eliminated.

12. The improved fish lure defined in claim 11 wherein at least one of said fishing devices includes a spinner.

13. The improved fish lure defined in claim 11 wherein at least one of said fishing devices includes a jig.

14. The improved fish lure defined in claim 11 wherein at least one of said fishing devices includes a blade member.

15. The improved fish lure defined in claim 11 wherein at least one of said fishing devices includes hook means.

16. The improved fish lure defined in claim 11 including a third fishing device attachable to said carrier member at an intermediate location between said opposed end portions.

17. The improved fish lure defined in claim 16 wherein said third fishing device is mounted for limited slidable movement along at least a portion of said carrier member.

* * * * *

UNITED STATES PATENT OFFICE
CERTIFICATE OF CORRECTION

Patent No. 4,815,233    Dated March 28, 1989

Inventor(s) Robert L. Pingel

It is certified that error appears in the above-identified patent and that said Letters Patent is hereby corrected as shown below:

Column 1, line 61, "o" should be --to--.

Column 2, line 54, "tee" should be --the--.

Column 5, line 4, "breakaqe" should be --breakage--.

Column 12, line 23, "is" should be --its--.

Signed and Sealed this

Eighth Day of August, 1989

Attest:

DONALD J. QUIGG

Attesting Officer

Commissioner of Patents and Trademarks